United States Patent [19]

Bottenschein et al.

[11] Patent Number: 4,615,406

[45] Date of Patent: Oct. 7, 1986

[54] GOLFCART WITH BATTERY DRIVEN DRIVE ASSIST

[76] Inventors: Karl Bottenschein, Marchenweg 16, D-7900 Ulm; Rolf Bierwirth, Brechtener Strasse 16, D-4670 Lunen-Brambauer, both of Fed. Rep. of Germany

[21] Appl. No.: 595,261

[22] Filed: Mar. 30, 1984

[51] Int. Cl.⁴ .......................................... B62D 51/04
[52] U.S. Cl. ........................... 180/191; 280/DIG. 5
[58] Field of Search .......................... 180/19.1, 11; 280/DIG. 5, DIG. 6

[56] References Cited

U.S. PATENT DOCUMENTS

| | | | |
|---|---|---|---|
| 2,962,106 | 11/1960 | Burnside et al. | 280/DIG. 5 |
| 3,059,713 | 10/1962 | Beggs | 180/19.1 |
| 3,199,621 | 8/1965 | Seaman | 180/19.1 |
| 3,407,892 | 10/1968 | Vosseller | 180/19.1 |
| 3,731,756 | 5/1973 | Hajec | 280/DIG. 5 |
| 3,989,116 | 11/1976 | Hirano | 280/DIG. 5 |
| 4,081,047 | 3/1978 | Lovell et al. | 280/DIG. 5 |
| 4,105,084 | 8/1978 | Baak | 180/19.1 |
| 4,427,084 | 1/1984 | Savard, Jr. | 280/DIG. 5 |

Primary Examiner—James C. Yeung
Attorney, Agent, or Firm—Price, Heneveld, Huizenga & Cooper

[57] ABSTRACT

A golf cart with battery-operated auxiliary drive is composed of a hand golf cart and a tractor apparatus, which are both releasably coupled together by a connecting element.

8 Claims, 8 Drawing Figures

GOLFCART WITH BATTERY DRIVEN DRIVE ASSIST

FIELD OF THE INVENTION

The invention relates to a golf cart according to the preamble of claim 1.

BACKGROUND OF THE INVENTION

For transportation of various golf clubs in a golf bag, a golf cart termed a "caddy" is generally used. Despite a few differences, these equipments possess a similar basic structure. They consist of a base frame, equipped with a sliding handle and with two laterally arranged, freely rotatable running wheels, which receives the golf bag. Such a golf cart can be raised and then rests stably on the underpart of its frame and on its two running wheels. The golf cart can also be tilted backwards and can then conveniently travel on its running wheels for transportation.

The golf clubs, together with the further equipment transported on the the golf cart, make up a considerable weight. Apart from this, golf courses are often laid out on hilly land. Because of this, there has increasingly been a changeover to the use of a golf cart driven by a battery-operated auxiliary motor. Such golf carts are three-wheeled. Besides the golf bag, they carry a battery and the drive motor which drives the two rear, laterally arranged wheels; the third wheel, arranged centrally at the the front, is mounted to rotate freely. There are also golf carts which, for transportation reasons, are comparably constructed with folding wheels [and] dismountable.

The conventional hand golf cart is not made superfluous by a golf cart driven by an auxiliary motor, since the motor-driven golf cart cannot be used on a number of golf courses, or only with special permission, and not at all in competitions. The use of a motor-driven golf cart on flat golf courses is also felt to be unsporting and is rejected. The owner of a motor-driven golf cart must therefore often transport both golf carts, i.e., the hand golf cart also, in his car; this usually involves transportation problems.

Because of this, the object of the invention is to unite both functions in a golf cart, and thus to create a golf cart which is used like the conventional hand golf cart provided with a base frame and two laterally arranged running wheels, but can also be operated with a motor.

SUMMARY OF THE INVENTION

According to the invention, this problem is solved by a tractor apparatus, with drive motor and drive wheels, which can be connected to a per se conventional hand golf cart by a quick-action coupling.

The golf cart according to the invention is a conventional hand golf cart, which can be connected by a quick-action coupling to a tractor apparatus which has a drive motor and drive wheels. Existing golf carts can thus also be subsequently converted to motor operation. The golf carts thus converted can, however, also be used without motor drive. Hence two golf carts, namely a hand-operated and a motor-operated golf cart, are superfluous, giving corresponding transportation advantages.

An accelerated changeover to motor operation or hand operation, respectively, is made possible by construction of the quick-action coupling as a plug-in coupling which joins the tractor apparatus to the golf cart via a connecting part which is suspended in a shackle provided on the hand golf cart and is put on a steering shaft on the tractor apparatus.

The traveling gear becomes suitable for cross-country work when the connecting part is constructed from two tubes, put one into the other and floatingly connected to each other by a bolt engaging in a tube opening.

It is also advantageous to provide two driving wheels on the tractor apparatus and a jointed pole, by means of which the motor-operated golf cart is steered, on the apparatus frame.

Furthermore, it is a suitable development to mount the drive wheels as loose wheels, i.e., freely rotatable, on a drive shaft, but to be driven with the shaft through a respective drive coupling. The golf cart can then easily be pulled by hand if the battery fails or comparable problems arise.

In a suitable embodiment of the invention, the speed of the golf cart is steplessly controllable. This takes place by means of the drive motor, i.e., for example, via a rotary switch by means of an easily manipulated rotary knob. The manual actuation of the rotary switch to control the drive can also be omitted. In a particularly suitable embodiment of the invention, it is therefore provided to couple the rotary switch via a control shaft to a spring drum arranged on the apparatus frame, the cord of the spring drum being passed along the pole and connected at the end to a holding ring. By pulling and holding ring and consequently unwinding the cord from the spring drum, the drive motor, and with it the golf cart, is set in motion. The further the holding ring, and this cord, is pulled out, the faster the golf cart goes, so that the speed of the golf cart always matches the speed at which the golfer walks, without his having to concentrate on control of the travel speed, as is the case with a manually actuable rotary switch.

By arrangement of an equalizing gear between the spring drum and the rotary switch, the arm movements occurring during walking are compensated for to a large extent, because a corresponding change of speed only occurs when the cord is pulled correspondingly far out.

The invention creates a motor-operated golf cart which can be very quickly converted into a normal hand golf cart by uncoupling the tractor apparatus. Screw connections do not have to be released for this. The uncoupling or coupling up is exclusively effected with a plug-in connection. The golf cart can hence be used without special practice. It does not require any large transport space, although it provides both possibilities, namely motor operation and hand operation.

DESCRIPTION OF THE DRAWINGS

Examples of embodiments of the invention are described below with reference to the drawing, in which are shown.

DESCRIPTION OF THE INVENTION

Figure 1:
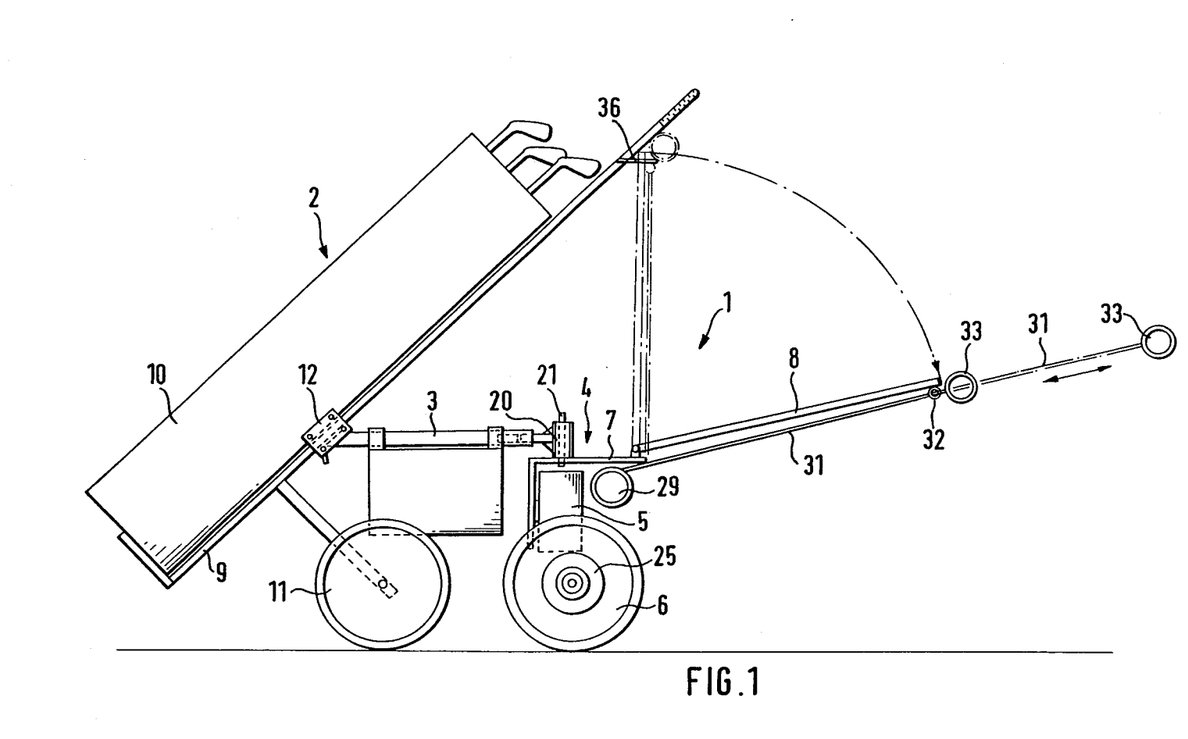
FIG. 1 is a side view of an embodiment of a golf cart, shown schematically.

The battery-operated golf cart, shown in the assembled position in FIG. 1, includes a usually hand-pushed golf cart 2 and an auxiliary apparatus 4 coupled to it by a connecting part 3 and possessing the drive motor 5, the drive wheels 6 and a pole 8 jointed to the apparatus frame 7.

As regards the hand-operated golf cart 2, it is a commercial product which generally consists of a push frame 9 to receive the golf bag 10 and two running wheels 11, mounted on the frame to rotate freely. Such a hand golf cart 2 can be brought into a standing position by tilting the push frame 9 forward, and in the tilted position, as shown in FIG. 1, is conveniently pushed by hand.

To couple such a commercial hand golf cart 2 to the auxiliary apparatus, the hand golf cart 2 is provided with an insertion shackle 12, in which the connecting part 3 can be suspended. According to FIGS. 2 and 3, the shackle 12 is formed by two side cheeks 13, between which the frame of the golf cart is arranged and which are connected together by screw bolts. The bolt which can be seen below in FIG. 2 delimits with the frame 9 of the hand golf cart 2 an insertion gap into which a suspension tongue 14 of the connecting part 3 can be inserted. The tongue 14 is formed, in the embodiment example shown, by a plate welded onto an oblique surface of the connecting part 3 with a hook-shaped projection 15 which engages in the insertion gap.

Figure 2:
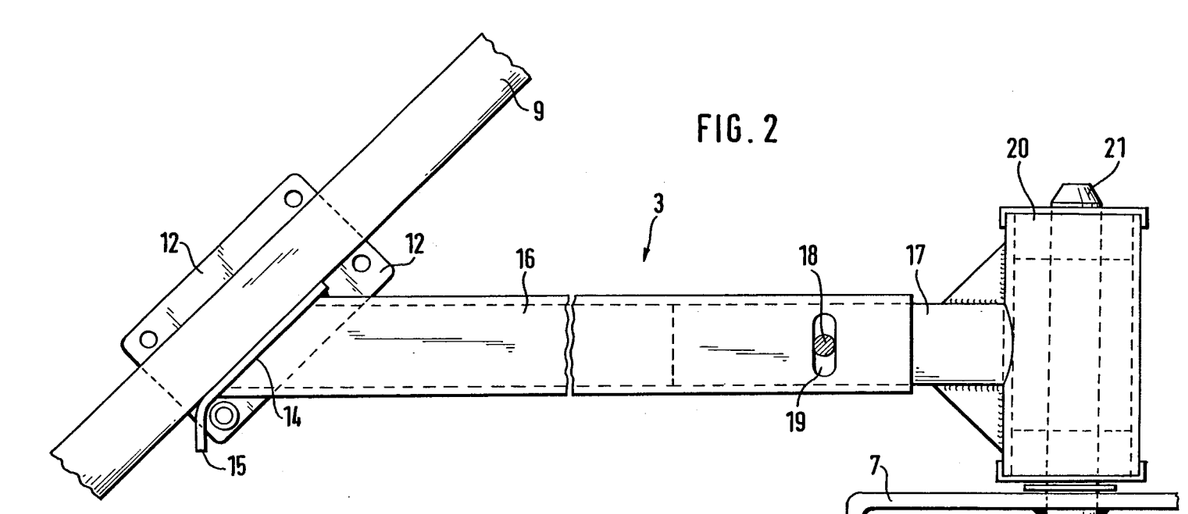
FIG. 2 is a view of the connecting part.
Figure 3:
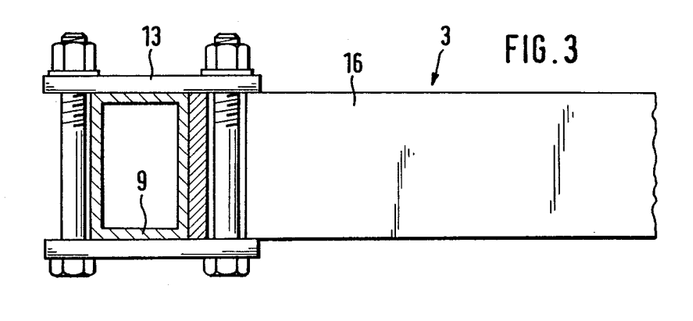
FIG. 3 is a sectional view through a push frame of the golf cart with plug-in shackle set on it for the connecting part.
Figure 4:
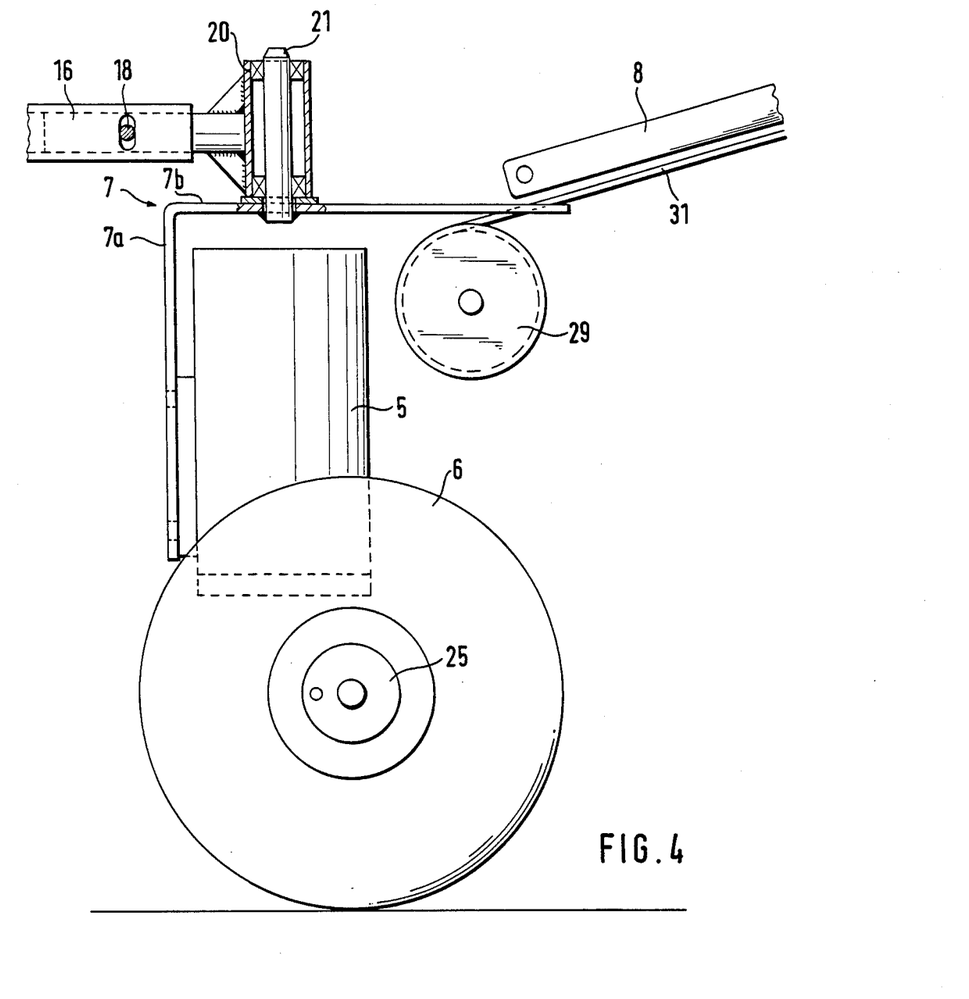
FIG. 4 is an enlarged view of the drive; and also

Corresponding to FIG. 2, the connecting part 3 includes two tubes 16 and 17, one inserted into the other, which suitably are floatingly connected to each other so that the drive wheels can conform to the ground. The floating mounting is effected, in the embodiment example shown, by a bolt 18 which engages in an opening 19 extending over a part of the periphery of the tube 17. The suspension tongue 14 is fastened to the end of the tube 16, while a mounting socket 20 is arranged at the end of the tube 17. By means of this mounting socket 20, the connecting part 3 can be pushed onto a steering shaft 21 attached to the apparatus frame 7. The mounting socket 20 can be constructed as a sliding bushing; however, in the embodiment example shown, two spaced-apart roller bearing rings are provided.

The mounting frame 7 of the tractor apparatus 4 is formed by an angle plate, to one shank 7a of which the drive motor 5 is attached and to the other shank 7b of which are attached the steering shaft 21 and also, pivotably, the pole 8.

Figure 5:
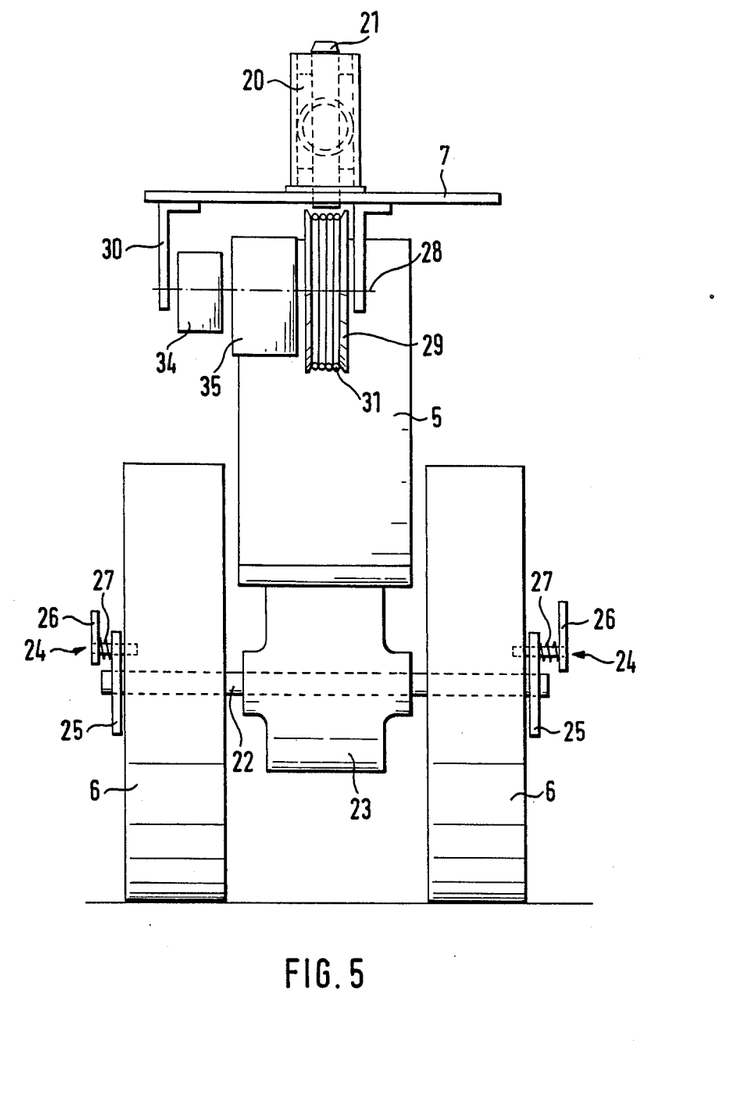
FIG. 5 is a likewise enlarged view of the drive, but at an angle of view rotated through 90°.

Corresponding to FIG. 5, the drive of the two drive wheels 6 is effected by a drive shaft 22, which is driven by a work gear 23 connected to the output shaft of the drive motor 5.

In the embodiment example shown, the two drive wheels 6 are mounted on the drive shaft 22, respectively free to rotate, coupling of the drive wheels to the drive being respectively effected by a drive coupling 24. The drive coupling 24 includes a driving plate 25 connected to the drive shaft 22, to rotate with it, and arranged outside the associated drive wheel 6. A drive bolt 26 is received in a bore of the driving plate 25 and can be inserted into a corresponding opening on the drive wheel 6 to couple the drive wheels to the drive. The drive bolt 26 can be screwed into the driving plate 25, so that it can be screwed into or out of the drive wheel to couple it or uncouple it. However, fitting of a spring 27, which constantly holds the drive bolt engaged in the corresponding opening on the drive wheel 6, is also suitable. In the disengaged position, the drive bolt can then be fixed by a latch which is not shown in more detail in the drawing.

The drive motor 5, which is suitably an electric motor supplied by a 12-volt battery, can be steplessly regulated; an electronic speed control is preferably supplied. Speed control can take place manually by means of a rotary switch. In the embodiment shown, however, the rotary switch is not arranged on the pole, but is received on the apparatus frame 7 and is coupled via a control shaft 28 to a spring drum 29. The control shaft 28 is mounted in flanges 30 of the apparatus frame 7. A cord is wound on the spring drum 29 and, in the embodiment example shown, is passed along the pole via a ring 32 fixed to the pole 8. A holding ring 33, visible in FIG. 1, is fastened to the end of the cord 31, and by means of it the cord 31 can be pulled out of the spring drum 29.

If the cord 31 is pulled by means of the holding ring 33 out of the spring drum 29, which always holds the cord 31 in a gently tensioned state by means of the built-in spring, the drive motor is set in motion. Due to the coupling of the spring drum 29 to the rotary switch 34, the speed of the drive motor becomes greater, the further the line is pulled out. Consequently, the golf cart constantly conforms to the walking speed of the golfer without his having to concentrate on the travel speed. To ensure a compensation of the arm movements which take place during walking, an equalizing gear 35, not described in more detail, is provided on the control shaft 28 between the rotary switch 34 and the spring drum 29. By means of this gear, it is ensured that corresponding speed changes also demand that the cord be pulled out correspondingly far.

The assembly of the battery-operated golf cart 1 is as simple as possible. The hand golf cart is positioned vertically for it. The connecting part 3 is then pushed with its mounting socket 20 onto the steering pin 21 and finally is inserted from above with the tongue 14, on the golf cart side, into the shackle 12 provided there. The battery, as can be seen from FIG. 1, is suspended on the connecting part 3, suitably in a pocket attached to it. After coupling up, the hand golf cart 2 only needs to be pivoted towards the auxiliary apparatus 7. If the holding ring is then pulled, the golf cart 1 is set in motion in the manner described above. As soon as the golfer stands still, the motor-operated golf cart 1 runs on until the holding ring 33 of the cord 31 is adjacent to the pole 8. The cord is then automatically wound up by the spring drum 29. On sideways motion, the pole is respectively pulled in the direction of travel, due to the constantly present gentle tension of the cord 31.

In the inoperative position of the golf cart 1, the pole 8 can be pivoted upwards and fixed to a holding clip 36 arranged on the frame 9 of the hand golf cart 2.

Figure 6:
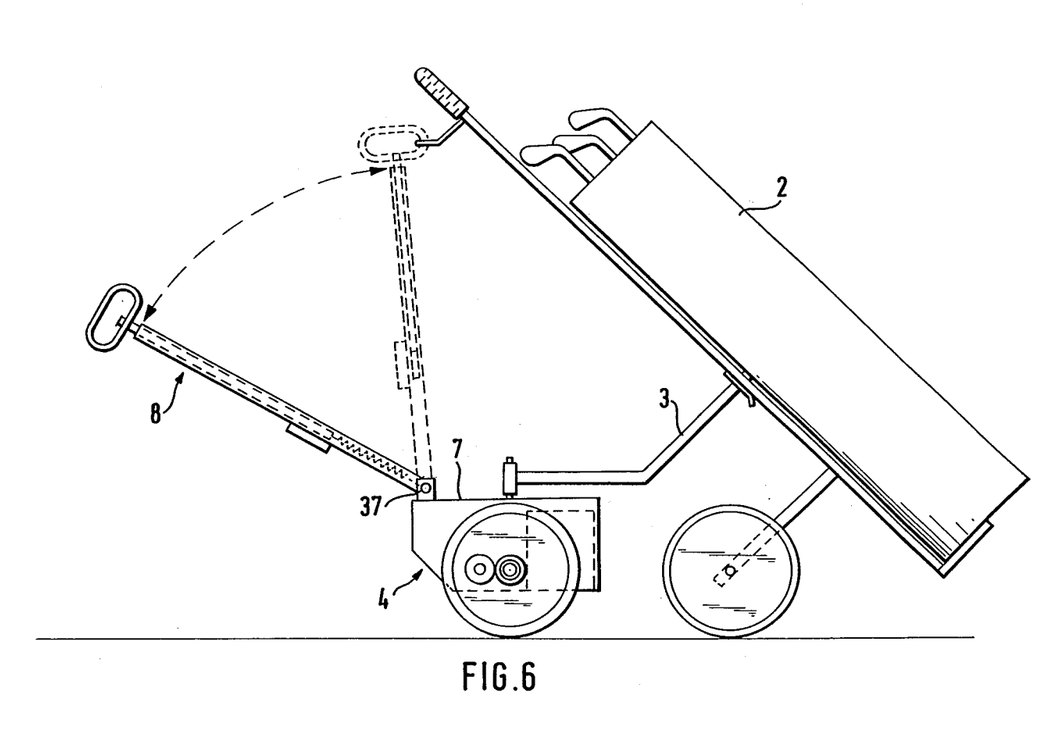
FIG. 6 is a side view of a further embodiment of the invention.
Figure 7:
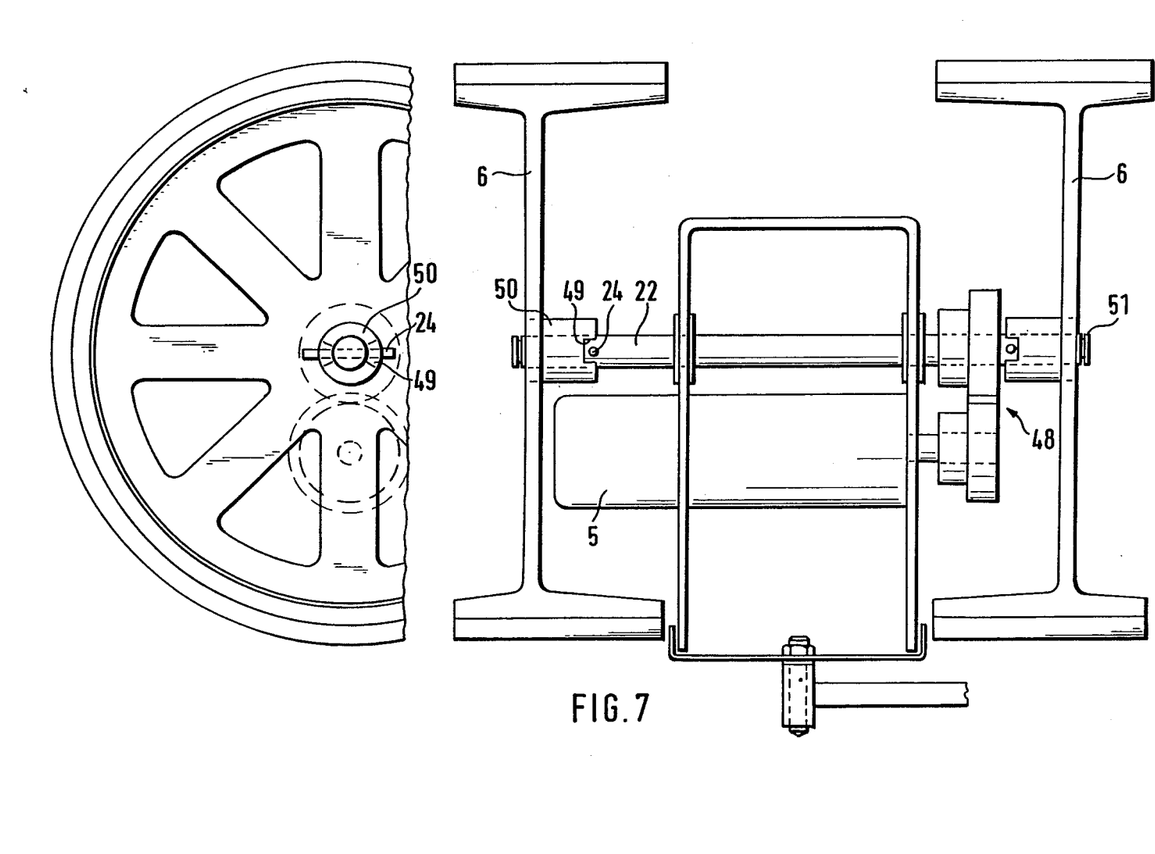
FIG. 7 is an enlarged view of the drive of this embodiment; and also
Figure 8:
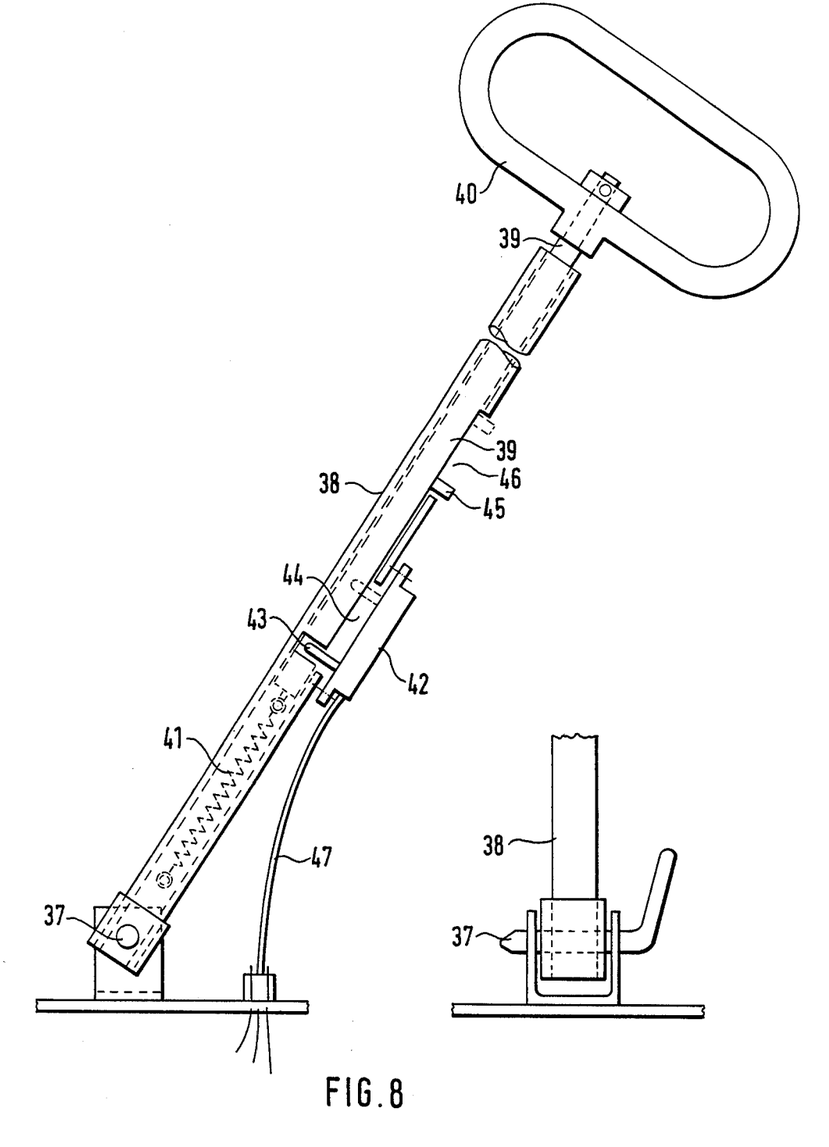
FIG. 8 is an enlarged view of the pole of the embodiment according to FIG. 6.

In the embodiment shown in FIGS. 6–8, the same reference numbers are used for corresponding components. As can be seen from FIG. 6, the connecting part 3 is constructed with a bend between the auxiliary apparatus 4 and the golf cart 2, and the apparatus frame of the tractor apparatus 4 is constructed as a totally enclosed box, which receives the battery that is accessible through a cover (not shown).

The pole 8 is pivotably connected by a bolt 37 to the apparatus frame 7, so that it is pivotable as can be seen from the drawing. Besides this, the pole 8 is formed by a tube 38, which can be clearly seen in FIG. 8 and in which a rod 39 is displaceably arranged. The rod 39 possesses, at its end projecting from the tube 38, a handle 40 which can be rotated through 360° with respect to the tube 38. The rod 39 is attached at its other end to a tension spring 41 which is received within the tube 38 and is fastened there. The tube 38 furthermore carries a sliding speed controller, referenced 42. This controller 42 is connected by its longitudinal slider 43 to the rod 39; the longitudinal slider 43 can engage in a bore or an opening of the rod 39. The tube 38 has a slotted hole, referenced 44, for this purpose. Furthermore, the rod 39 possesses a holding pin 45 which extends through a guide slot 46, likewise constructed as a slotted hole, of the tube. The sliding speed controller 42 is, in addition, connected to the motor 5 and the associated electronics. This is schematically shown by the lead, referenced 47.

In the pushed-in state of the rod 39, shown in FIG. 8, the drive motor 5 is switched off. However, as soon as the handle 40 is pulled out, thus when the golf cart user pulls the golf cart behind him, the drive motor 5 is switched on via an electronic control device received in the box-shaped apparatus frame 7. Speed control occurs automatically in dependence on the extent to which the handle 40, and with it the rod 39, is pulled out of the tube 38. Due to the coupling of the rod 38 to the speed controller 42 via the longitudinal slider 43, the speed of the drive motor 5, and with it that of the golf cart, becomes either faster or slower according to the extent to which the handle 40 and with it the rod 39 is pulled out of the tube 38 or pushed into it. Consequently, the drive motor thus automatically conforms to the walking speed of the golfer at any given time. If the handle 40 is moved back to the position shown in FIG. 8 by pushing the rod 39, the drive motor 5 is switched off in the thus pushed-in state of the rod 39. In an improvement, by means of built-in electronics the drive motor is likewise connected in circuit such that the motor brakes itself. This is advantageous particularly on traveling down a hill, since the motor then brakes the golf cart.

The tension spring 41 represents a safety element, since when the handle 40 is released the rod 39 is automatically pulled into the tube 38, due to the spring 41, and the drive motor is hence switched off.

As can be seen from FIG. 7, the drive wheels 6 are connected, each by a respective driving pin 24, to rotate with the drive shaft 22, which is driven by the motor 5 via a gearwheel drive or V-belt drive 48. For motorless operation, the pins 24 can be pulled out, so that the freely mounted wheels are then uncoupled from the drive shaft 22. For equalization when traveling on curves, the driving pins 24 engage in correspondingly wide recesses 49 of the wheel hubs 50 of the wheels 6, so that the wheels 6 can carry out, in the coupled state with the drive shaft 22, a limited relative rotation with respect to the drive shaft 22. The wheels 6, which can respectively be pushed on from outside, are prevented from falling off by means of rings 51.

The sliding-out motion of the rod 39 is limited by the holding pin 45, which strikes against the end of the guide slot of the tube 38. If the rod 39 pushes with its holding pin 45 against the guide tube, as is the case with the rod 39 fully pulled out, the golf cart drive can be manually supported, in particular on extreme gradients, by the pull exerted.

The apparatus frame 7, constructed as a box, can also receive the whole electronics within it, as well as the motor 5 and the battery. The pole 8 can be demounted by pulling out the bolt 37 from the apparatus frame 7.

We claim:

1. In combination a two wheel normally manually operable golf cart having a frame and a motorized drive unit having a frame element including a ground engaging support and drive means, latch means for attaching said motorized drive to the golf cart, said latch means including an arm secured to said drive unit against all but minor ground surface irregularity compensating vertical movement, said arm having a free end, a latching plate secured to said free end having a face positioned at an angle to the horizontal which corresponds generally to the angle at which the cart's frame is maintained when it is being moved manually, an anchor plate mounted on said cart frame having a face positioned to be parallel to and seat against said face of said latching plate; said latching plate having a hook portion at its lower end, said anchor plate having sides forming a channel therebetween of a width to receive said latching plate therebetween and hold said latching plate against lateral and twisting movement, said anchor plate having a keeper member at its lower end spaced outwardly from the face of the anchor plate sufficiently to permit said hook portion to be seated between said face and keeper to detachably latch said cart to said motorized drive with the engagement between the faces of said plates maintaining said cart frame inclined at the same angle as the face of said latching plate.

2. The combination golf cart and motorized drive unit described in claim 1 wherein control means is provided for varying the speed of forward motion of the motorized drive unit, said means having an operator grip element at its forward end by which an operator can pull said control means, said control means being responsive to the forward speed of the operator for varying the speed of the motor.

3. The combination golf cart and motorized drive unit described in claim 2 wherein said control means includes an elongated handle pivotally mounted to said drive unit for vertical movement, an anchor on said golf cart for detachably securing said handle in substantially vertical position when said combination cart and attachment are stationary.

4. The combination golf cart and motorized drive unit described in claim 1 wherein said drive unit includes a rigid elongated arm member, said latch means being secured to one end of said elongated arm member; pivot means securing said elongated arm member to said drive unit for lateral motion.

5. The combination golf cart and motorized drive unit described in claim 1 wherein said motor is mounted on said drive unit between said wheels, said electrical energy source being a battery and dependent means suspending the same from and beneath said arm member.

6. The combination golf cart and motorized drive unit as described in claim 1 wherein an anchor is provided on said golf cart for detachably securing said handle in substantially vertical position when said combination cart and attachment are stationary.

7. In combination a two wheel normally manually operable golf cart having a frame and a motorized drive unit having a frame element including a ground engaging support and drive means, latch means for attaching said motorized drive to the golf cart, said latch means including an arm secured to said drive unit against all but minor ground surface irregularity compensating vertical movement, said arm having a free end, a pair of plates having planar abutting faces, one of said plates being rigidly secured to the frame of said golf cart and the other to the free end of said arm; one of said plates having a latch element and the other of said plates having a keeper element engageable with said latch element for detachably connecting said golf cart to said motorized drive unit; said latch and keeper having laterally spaced engaging surfaces holding said golf cart against pivotal movement about a vertical axis with respect to said arm, means pivotally mounting said arm to said motorized drive unit for lateral pivotal movement.

8. In combination a two wheel normally manually operable golf cart having a frame and a motorized drive unit having a frame element including a ground engaging support and drive means, latch means for attaching said motorized drive to the golf cart, said latch means comprising: a pair of plates one on the cart and the other on the frame which plates seat in face to face abutment when the cart and frame are latched together, the plate on the frame being inclined to the horizontal at an angle to position the cart for transport without danger of inadvertent loss of articles on the cart, said plates including detachably engaging hook and retainer means for transmitting forward motion from the frame to the cart.

* * * * *